(No Model.)
E. WESTON.
REGULATOR FOR ELECTRIC GENERATOR.
No. 264,980. Patented Sept. 26, 1882.
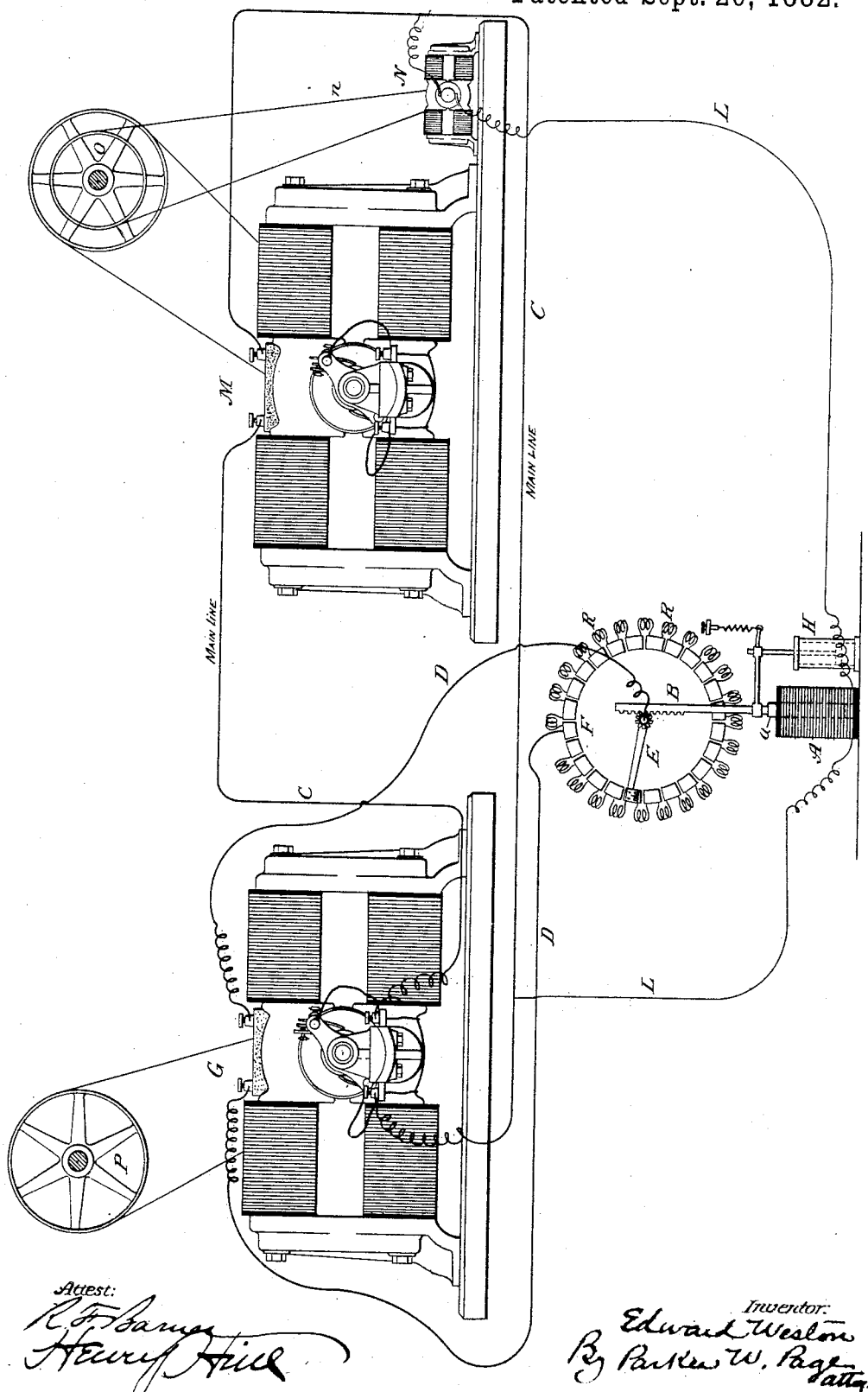

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

REGULATOR FOR ELECTRIC GENERATORS.

SPECIFICATION forming part of Letters Patent No. 264,980, dated September 26, 1882.

Application filed May 8, 1882. (No model.)

*To all whom it may concern:*

Be it known that I, EDWARD WESTON, a subject of the Queen of England, and a resident of Newark, in the county of Essex and State of New Jersey, have invented certain new and useful Improvements in Systems for the Electrical Transmission of Power, of which the following is a specification, reference being had to the drawings accompanying and forming part of the same.

In another application of even date herewith I have described a method of regulating the amount of power transmitted from a generator to an electro-magnetic motor, which involved the employment, in conjunction with the dynamo-electric generator and motor, of an independent circuit, including the field-magnet coils of the generator and two opposing dynamo-electric machines, one driven by the engine and the other by the motor, the purpose of such arrangement being to vary the magnetic intensity of the field of the main generator in an inverse proportion to the speed of the motor, whereby the current generated is in proportion to the work to be done by the motor. The subject of my present application is a method of accomplishing the same result by the use of one dynamo-electric machine in place of the two above mentioned, and the substitution for the other of a rheostat constructed and operated under substantially the following conditions: The field of the main generator is excited by a derived circuit from the machine, or by an independent circuit over which there is a constant current flowing. In the main circuit of the generator is included an electro-magnetic motor. A small dynamo or magneto machine is driven by this motor, the circuit of said machine being independent of the main circuit, and including an electro-magnet or its equivalent, such as a helix, in which works a soft-iron core. In the field-circuit of the main generator is an adjustable resistance or rheostat that is varied and controlled by the electro-magnet above mentioned in such manner that as the attraction of the magnet increases a greater amount of resistance is introduced into the field-circuit, and vice versa. From this it will be seen, in any given case, if the motor be unloaded and its armature have a tendency to rotate at a high rate of speed, that the tendency is checked by the increased amount of current generated by the small machine driven by the motor, the consequent increase of the attractive power of the magnet in the circuit of said machine, and the introduction of more resistance in the field-circuit of the main generator, and also that the converse of this takes place when by the loading of the motor its speed is reduced.

In the appended drawings this system of regulation is illustrated, as far as possible, by a diagram, in which G designates the main generator driven by a pulley, P, rotated by any convenient source of power. M is the motor in circuit with the generator; C C, the conductors of the motor-circuit or main line. D D represent the conductors of a circuit derived from the main and including the coils of the field-magnets of the generator G. One of these conductors is carried to a contact-arm, E, the other to the first of a circle of contact-plates F, connected by resistance-coils R. The arm E is carried by a pinion-shaft, which is rotated by a rack-bar, B, that is controlled as to position by the core $a$ of an electro-helix, A. A dash-pot, H, is connected to the core $a$ or to the rack-bar for the purpose of preventing sudden movement, and a spring, a weight, or an equivalent device is connected with the said core for the purpose of partially withdrawing it from the helix when no current is flowing. The helix A is included in the circuit L of a small dynamo-machine, N, driven by the motor M by direct connecting-gear or by a belt, $u$, from a shaft, O, to which the motion of the motor is transmitted. It is evident that the return-wire, or one-half of circuit L, may be one of the main conductors C C, as shown.

In practical operation the arm E at the outset interposes but little resistance in the field-circuit of the generator G. When this latter is started the motor will have a tendency to run at a high speed. This is, however, prevented by the increase of current in circuit L, which is followed by the introduction of resistance in the field-circuit D. If, now, the motor be loaded and its speed reduced, the current in circuit L is also reduced, whereupon resistance is withdrawn from circuit D, and the machine G generates more current.

By the above-described arrangement an accurate and automatic regulation of the current generated is effected, and the most efficient working conditions of the system maintained.

Having now described my invention, what I claim as new, and desire to secure by Letters Patent, is—

1. The combination, with a main circuit, a generator, and a motor, of a dynamo-electric machine driven by the motor, a circuit from the same, and mechanism included therein and operated thereby, and constructed or arranged to vary the magnetic intensity of the field of the generator in the main circuit inversely as the speed of the motor, substantially as and for the purpose set forth.

2. In a system for the transmission of power by electricity, the combination of a main circuit, C, a generator, G, and a motor, M, a dynamo-electric machine, N, driven by the motor, a circuit, L, including the same, a derived circuit, D, including the field-magnet coils of the generator G, a magnet, A, in circuit L, and devices for varying the resistance of circuit D, as and for the purpose set forth.

In testimony whereof I have hereto set my hand this 6th day of May, 1882.

EDWARD WESTON.

Witnesses:
 HENRY A. BECKMEYER,
 W. FRISBY.